US012625856B2

(12) United States Patent
Bensberg

(10) Patent No.: US 12,625,856 B2
(45) Date of Patent: May 12, 2026

(54) THROUGHPUT BY ALLOWING QUERIES TO USE A MARGINALLY DELAYED TRANSACTIONAL VIEW

(71) Applicant: SAP SE, Walldorf (DE)

(72) Inventor: Christian Bensberg, Heidelberg (DE)

(73) Assignee: SAP SE, Walldorf (DE)

( * ) Notice: Subject to any disclaimer, the term of this patent is extended or adjusted under 35 U.S.C. 154(b) by 29 days.

(21) Appl. No.: 18/923,966

(22) Filed: Oct. 23, 2024

(65) Prior Publication Data

US 2026/0111409 A1 Apr. 23, 2026

(51) Int. Cl.
*G06F 16/23* (2019.01)
(52) U.S. Cl.
CPC ................................ *G06F 16/2322* (2019.01)
(58) Field of Classification Search
CPC .................................................. G06F 16/2322
See application file for complete search history.

(56) References Cited

U.S. PATENT DOCUMENTS

2015/0254344 A1* 9/2015 Kulkarni ............... G06F 16/951
707/747
2020/0394182 A1* 12/2020 Lee ....................... G06F 16/273

* cited by examiner

*Primary Examiner* — Robert W Beausoliel, Jr.
*Assistant Examiner* — Nirav K Khakhar
(74) *Attorney, Agent, or Firm* — Sterne, Kessler, Goldstein & Fox P.L.L.C.

(57) ABSTRACT

Disclosed herein are system, method, and computer program product embodiments for implementing database queries using a major commit time stamp (CTS). An embodiment operates by receiving a data query indicating a predetermined delay from a user equipment (UE) and retrieving a major CTS from a memory. The data query corresponds to data in the memory. The major CTS indicates an age of the data. The embodiment determines that the major CTS is within the predetermined delay. In response to determining that the major CTS is within the predetermined delay, the embodiment transmits the data corresponding to the major CTS to the UE.

20 Claims, 7 Drawing Sheets

500

Client
506

Index Server 504

Data

7000

7010

Index Server 502

Data

7000

7001

7002

7010

7014

7015

Computer System 700

THROUGHPUT BY ALLOWING QUERIES TO USE A MARGINALLY DELAYED TRANSACTIONAL VIEW

BACKGROUND

Data stored in a database may be copied to additional databases. This process can be referred to as database replication. This database replication process can serve various purposes. For example, the database replication can provide availability of the data in a remote location, or be used to distribute a high read load on the data. For another example, the database replication can recover the data when the database is damaged or destroyed. However, when a client device, such as user equipment (UE), requests reading data from one of the additional databases, it can be challenging to determine which data to read because the data stored in the database and the additional databases may differ. A database may hold so much data that it may be advantageous to span it to multiple physical resources. Such a database is called a "distributed database". In a distributed database network communication occurs and may cause delays. When it comes to reading data from another physical host, a similar challenge exist so determine which data to read.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
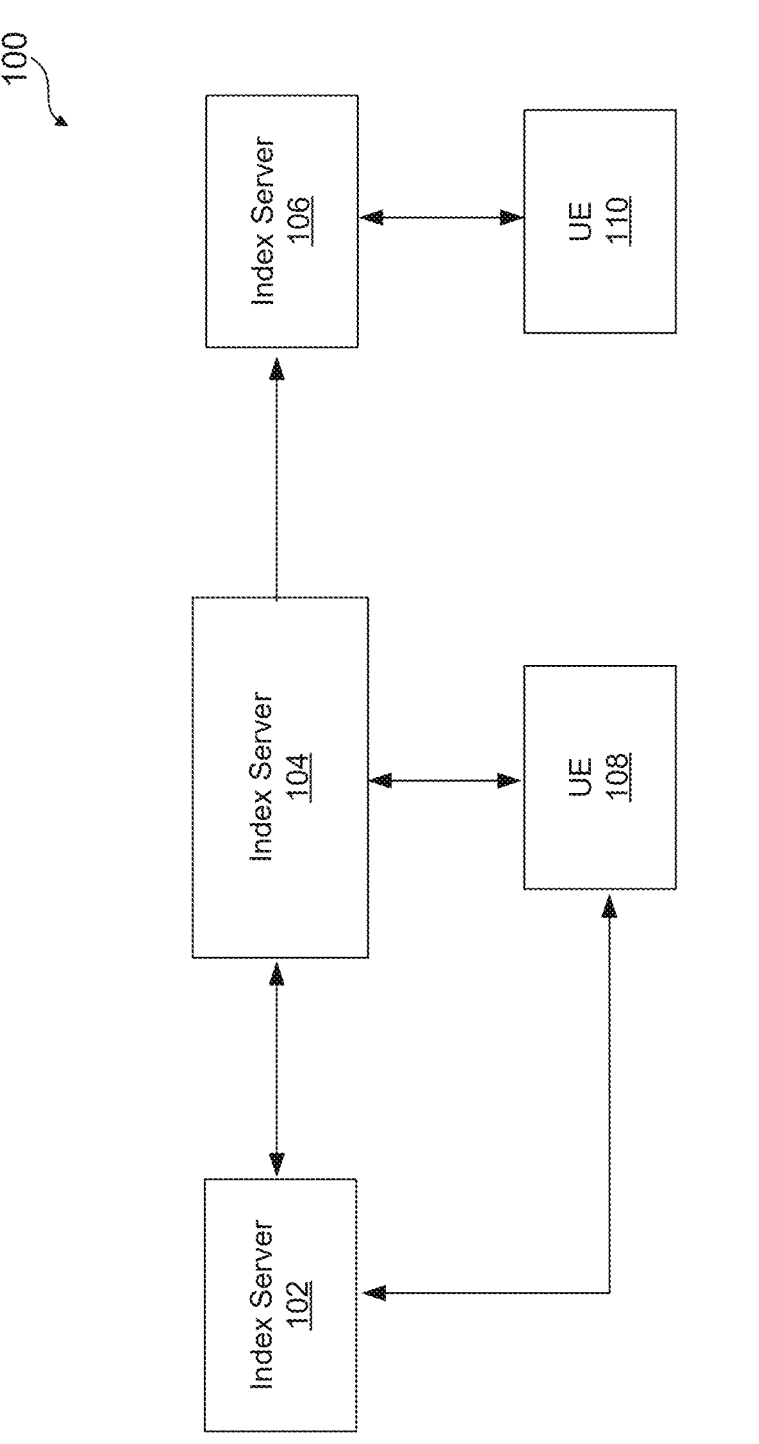
FIG. 1 illustrates an example database system implementing database queries using a major commit time stamp (CTS), according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatus, system, computer program product, and method embodiments for implementing database queries using major commit time stamp ("major CTS").

In some embodiments, data in a database is copied to additional databases. For example, a first database may transmit the data to a second database and a third database. Thus, the second and the third database may store copies of the data stored in the first database. This process can be referred to as database replication. In some embodiments, the database replication can serve various purposes. For example, a user may be located far away from the first database but closer to the second database. Thus, the database replication may improve availability of the data to the user. For another example, when the first database is damaged or destroyed, the data can still be recovered from the second and/or the third databases. As another example, a replica of the data may be used for load balancing.

In some embodiments, the first database may split the data into a first portion, a second portion, and a third portion. The first database can store the first portion, the second portion, and the third portion in a first host, a second host, and a third host respectively. In some embodiments, the first host, the second host, and the third host may be computers or servers that are located in the same of in different geographical locations. In such a case, the first database that includes the first host, the second host, and the third host can be referred to as a distributed database.

In some embodiments, for the database replication, the first database may continuously update the data. For example, the first database may store changes, such as adding and removing data, as change records. In addition, the change records may be time stamped based on the times when the changes were made. In some embodiments, the first database may also configure the second and the third databases to make same changes so that the data stored in the second and the third database are consistent with the data stored in the first database. In some embodiments, the data in the first database may be updated frequently. In such a case, the first database may configure the second and the third database to make updates with a high frequency. For example, the first database may transmit a change request every couple of milliseconds. Such high-frequency updates/change requests may be burdensome because they cost resources for the first database as well as the second and the third database. To reduce the burden, the first database may bundle a plurality of changes together and transmit the change request less frequently. In some embodiments, each update by itself may include minor changes. Thus, the difference between transmitting a change request for every update and transmitting a change request for every couple of updates may be insignificant in terms of data volume.

In some embodiments, the second and/or the third databases may not include the most up-to-date changes. Such the differences may cause delays in data queries. For example, the second database may receive a data query from a user equipment (UE). In some embodiments, the UE can be a client or a client device. The query may indicate a time stamp (CTS) 7004, which may be the latest time stamp. However, the data in the second database may correspond to a time stamp 7002. Thus, the data in the second database is not up-to-date. In such a case, the second database may wait until data records with time stamp 7004 are received from the first database to return the data to the UE. This causes delays for the UE to receive requested data. In some embodiments, such a delay is not always worth it. As discussed above similarly, the changes from the data at the time stamp 7002 and the data at the time stamp 7004 may be minor. Thus, the UE may prefer to receive the data at the time stamp 7002 without waiting for further updates. In some embodiments, the UE may include, but is not limited to, computer systems, servers, cloud systems, cloud servers, laptops, desktops, personal computers, databases, user equipment, and the like.

In some embodiments, the UE may transmit to the second database a query indicating a predetermined delay, such as two seconds. In such a case, the second database checks whether the data currently stored in the second database are within the predetermined delay. For example, the second database may determine that the data are updated less than two seconds ago. Thus, the second database is able to return the data that is marginally out-of-date as indicated by the query as acceptable. In some embodiments, the second database may determine an age of the data in order to determine whether the data currently stored in the second database are within the predetermined delay. In some embodiments, the second database may determine the age based on a major commit time stamp (CTS). The first database can constantly inform the second database regarding the major CTS. For example, the first database may transmit heartbeat messages to the second and the third database indicating a time stamp of the latest update. Thus, the second and the third database can determine the age of the data based on when the heartbeat was received.

FIG. 1 illustrates an example database system implementing database queries using a major commit time stamp (CTS), according to some embodiments of the disclosure. The example 100 is provided for the purpose of illustration only and does not limit the disclosed embodiments. The example 100 may include, but is not limited to, index servers 102, 104, and 106 and UEs 108 and 110. In some embodiments, the index servers 102, 104, and 106 and the UEs 108 and 110 may include, but is not limited to, computer systems, servers, cloud systems, cloud servers, laptops, desktops, personal computers, databases, user equipment, and the like. In some embodiments, the index servers 102, 104, and 106 can form a distributed database.

In some embodiments, the index server 102 may be a master server and the index server 104 may be a replica server. Thus, index server 104 may store replica data of the index server 102. For example, the index server 102 may transmit replica of data stored in the index server 102 to the index server 104. The index server 102 may further transmit updates of the data to the index server 104. In some embodiments, the index server 102 may include a plurality of updates with corresponding time stamps, such as 7000, 7001, 7002, 7003, 7004, and 7005. The higher the number, the later in time. Thus, the update of the time stamp 7005 is the latest update here. In some embodiments, the index server 102 may transmit the updates to the index server 104. During the time when the index server 102 transmits the updates, the index server 104 may receive a query from the UE 108. However, data between the index server 102 and the index server 104 may be different due to a delay. For example, the index server 104 may receive the updates of the time stamps 7000, 7001, 7002, 7003, and 7004 when the index server 104 receives the query. However, the update of the time stamp 7005 may still be pending. This may be because of a delay in making the change in the index server 104. For example, the index server 102 may have transmitted the updates, but the index server 104 have not yet completed changes based on the updates before receives the query from the UE 108. Thus, the update of the time stamp 7005 is not yet a part of the index server 104. In such a case, if the query indicates the time stamp 7004, the index server 104 may transmit the data that include the updates up to the time stamp 7004 to the UE 108. However, if the query indicates the time stamp 7005, the index server 104 may need to wait until the update of the time stamp 7005 completes to transmit to the UE 108. For example, the index server 104 may wait until receiving the updates from the index server 102 and the update of the time stamp 7005 is finalized in the index server 104 to transmit to the UE 108.

In some embodiments, the index server 102 may bundle updates when writing to the index server 104 as discussed above. For example, the index server 102 may have updated at time stamps 7000, 7001, 7002, and 7010. The index server 102 may configure the index server 104 to update after the time stamps 7000 and 7010. Thus, instead of configuring the index server 104 to update four times, i.e., at the time stamps 7000, 7001, 7002, and 7010, the index server 102 may configure the index server 104 to update two times, i.e., at the time stamps 7000 and 7010 and skipping the time stamps 7001 and 7002. Thus, after the time stamp 7010, the index server 102 may configure the index server 104 to update regarding changes made in the time stamps 7001, 7002, and 7010. This is beneficial because both the index servers 102 and 104 save cost of updating at the time stamps 7001 and 7002.

In some embodiments, the query from the UE 108 may indicate a predetermined delay, such as two seconds, instead of a particular time stamp. In such a case, the index server 104 may return the data to the UE 108 if the data is within the predetermined delay. Otherwise, the index server 104 may wait for an update from the index server 102 to satisfy the predetermined delay. For example, the index server 104 may determine that the latest update in the index server 104 corresponds the time stamp 7010. The index server 104 may further determine that the time stamp 7010 has an age of 0.7 seconds. In such a case, the data in the index server 104 is within the predetermined delay because 0.7 seconds is smaller than two seconds. Thus, the index server 104 may transmit the data to the UE 108. In some embodiments, the age of the time stamp 7010 may be more than two seconds, such as 2.2 seconds. In such a case, the index server 104 may determine that the data in the index server 104 is out of date. Thus, the index server 104 may refrain from transmitting to the UE 108 until the data in the index server 104 becomes up-to-date. For example, the index server 104 may receive a new update from the index server 102 and an age of the new update is less than two seconds. For another example, the index server 102 may inform the index server 104 that the 7010 update is still up-to-date via a heartbeat message as discussed below.

In some embodiments, the index server 104 determines ages of updates based on heartbeat messages. For example, the index server 104 may receive a heartbeat message from the index server 102 when receiving the update of the time stamp 7010 at a present time. The heartbeat message may indicate that the time stamp 7010 is a major CTS. In such a case, the index server 104 is informed that the update of the time stamp 7010 is the most up-to-date update from the index server 102. 0.7 seconds later, the index server 104 may receive the query from the UE 108. At that point, the age of the 7010 update is 0.7 seconds. In some embodiments, the index server 102 may transmit heartbeat messages without transmitting an update. For example, after the index server 102 transmits the update of the time stamp 7010, there is no update to the data in the index server 102 in a period of time, such as one second. In such a case, the index server 102 may transmit a second heartbeat message to the index server 104 indicating that the update of the time stamp 7010 is still the most up-to-date update. Thus, when the index server 104 receives a query 0.5 seconds after receiving the second heartbeat message, the index server 104 may determine that the age of the update of the time stamp 7010 is 0.5 seconds counting from the time when the second heartbeat message was received, not 1.5 seconds that counts from the time when the update of the time stamp 7010 was received. In other words, the second heartbeat message effectively refreshes a recentness of the update of the time stamp 7010.

In some embodiments, the index server 102 may include more recent updates than the index server 104, such as updates of time stamps 7014 and 7015. However, because the index server 102 bundles multiple updates when transmitting to the index server 104, the index server 102 may hold on transmitting the updates of 7014 and 7015 until more updates are made. Thus, even though index server 102 has made the updates at time stamps 7014 and 7015, the heartbeat message may still indicate that the update of 7010 is the most up-to-date update.

In some embodiments, the UE 108 may transmit a write command to the index server 102 to write an update into the index server 102. The UE 108 may transmit the write command directly to the index server 102 or indirectly via the index server 104. In either case, the index server 102 may commit the update based on the write command at a time stamp, such as a time stamp 7020. After that, the index server 102 may transmit the update to the index server 104, just like other updates that the index server 102 made. As discussed above, the index server 102 may hold up transmitting the update to bundle multiple updates and the index server 102 may indicate to the index server 104 that the update of the time stamp 7010 is still the most up-to-date update even though the update of the time stamp 7020 has completed in the index server 102. In some embodiments, the UE 108 may transmit a read query to the index server 104 to check whether the write command was successfully committed. In such a case, the UE 108 is particularly interested in knowing whether the update of the time stamp 7020 was completed in the index server 104, not just the receiving the most up-to-date updates. Thus, the read query may indicate the time stamp 7020 without the predetermined delay. In this way, the index server 104 may wait until the index server 102 transmits the update of the time stamp 7020 and the index server 104 has completed writing the update of the time stamp 7020 to transmit the data of the index server 104 to the UE 108. For example, the index server 104 may complete writing the update of the time stamp 7020. At this point, the index server 104 may return the data in the index server 104 to the UE 108 because the update of the time stamp 7020 is included in the data.

In some embodiments, data may correspond to tables. For example, a first table may include data of a project of a company and a second table may include data of a department of the company. Thus, the index servers 102, 104, and 106 may include one or more tables. In some embodiments, a table may be split into multiple partitions. For example, a third table may include a first portion of data stored in the index server 102, a second portion of data stored in the index server 104, and a third portion of data stored in the index server 106. Similarly as discussed above, the index servers 102, 104, and 106 may form a distributed database this way. In some embodiments, the UE 108 may transmit a read query extracting data in the third table to the index server 104. Because the index server 104 does not have the first and the third portions of the data, the index server 104 may transmit queries to the index servers 102 and 106, which may then respectively transmit the first and the third portions of the data back to the index server 104. The index server

104 may combine the first, the second, and the third portions of the data to be the third table and transmit the third table to the UE 108.

In some embodiments, the UE 108 may write data to multiple tables stored in multiple index servers. For example, the UE 108 may transmit a write command to the index server 104. The write command may include first data to be stored in the second table in the index server 102, second data to be stored in the second portion of the third table in the index server 104, and third data to be stored in the third portion of the third table in the index server 106. In some embodiments, the index server 102 may be a master index server. In such a case, the index server 104 forwards the write command to the index server 102. Because the index server 102 is the master server, it commits writing the first data to the second table by itself. It assigns it the commit time stamp 7012. The index server 102 then transmits a pre-commit command regarding the second data to the index server 104 and a pre-commit command regarding the third data to the index server 106. After the index servers 104 and 106 confirm, the index server 102 then transmits post-commit commands to the index servers 104 and 106 to complete writing the second data and the third data.

In some embodiments, the index server 106 may complete writing the third data prior to the index server 104 completes writing the second data. For example, index server 104 may take a longer time to prepare resources to complete writing the second data. In such a case, there may be a gap period when the index server 106 completed writing the third data, but the index server 104 may still be pending the post-commit command. In some embodiments, the UE 110 may transmit a read query to the index server 106 during the gap period. Because the first data, the second data, and the third data are all included in the write command received by the index server 104, they all correspond to a time stamp, such as the time stamp 7011. Thus, when the index server 106 receives the read query from the UE 110, the index server 106 may determine that the most up-to-date update is the third data in the third portion of the third table corresponding to the time stamp 7011. In such a case, the index server 106 may send a query to the index server 104 requesting the second portion of the third table with an update corresponding to the time stamp 7011. However, as discussed above, the index server 104 may have not completed writing the second data, which correspond to the time stamp 7011, into the second portion of the third table in the index server 104. Thus, the index server 104 may need to wait until the writing of the second data is complete. This can cause delays in returning data back to the UE 110.

In some embodiments, the index server 106 may be informed of a major CTS, as similarly discussed above. For example, the index server 102 may transmit a heartbeat message to the index server 106 indicating that the update of the time stamp 7010 is up-to-date. When the index server 106 receives the read query from the UE 110, as discussed above, the index server 106 may determine that the heartbeat message was received 0.8 seconds ago and thus the update of the time stamp 7010 has an age of 0.8 seconds. Furthermore, the read query may indicate a predetermined delay, such as 2 seconds. In such a case, the index server 106 may transmit a read query to the index server 104 requests data corresponding to the time stamp 7010, instead of the time stamp 7011 even though the index server 106 includes the update of the time stamp 7011. Once the index server 106 receives updates of the time stamp 7010 from the index server 104 and possibly from the index server 102, the index server 106 combines all the updates of the time stamp 7010 and transmits them to the UE 110. In this way, the index server 104 does not wait for the update of the time stamp 7011 and thus no delay in waiting is required. On the other hand, if the index server 106 receives the read query more than two seconds after receiving the heartbeat message, the index server 106 may determine that the update of the time stamp 7010 is out-of-date and wait until further updates or heartbeat message to transmit to the UE 110. To sum up, when accessing local data and data on other index servers, index server 106 may need to determine a read time stamp, indicating a freshness of the data. In some embodiments, index server 106 may take the highest time stamp in the local data to access the other index servers, or it may use the currently highest major CTS, if it does not lag behind more than a fixed number of seconds (e.g., 2 seconds).

In some embodiments, the index servers 104 and 106 may form a distributed database. Thus, the distributed database may split data into a first portion and a second portion and may store the first portion in the index server 104 and store the second portion in the index server 106. For example, the data may include table 1 and table 2. The distributed database may store the table 1 in the index server 104 and store the table 2 in the index server 106. Thus, the index servers 104 and 106 may operate similarly as discussed above regarding the distributed database and also similarly as index servers 602, 604, and 606 below in FIG. 6. In some embodiments, the index servers 104 and 106 may store data replication in other index servers. For example, the index server 104 may transmit its data, such as the first portion of the data to the index server 102 as data replication. Thus, the index servers 102 and 104 may operate similarly as discussed above regarding the data replication and also similarly as index servers 502 and 504 below in FIG. 5. In addition, the index server 106 may also transmit its data, such as the second portion of the data to another index server as data replication. In this way, the index servers 102, 104, and 106 can perform replication of the distributed database.

Figure 2:
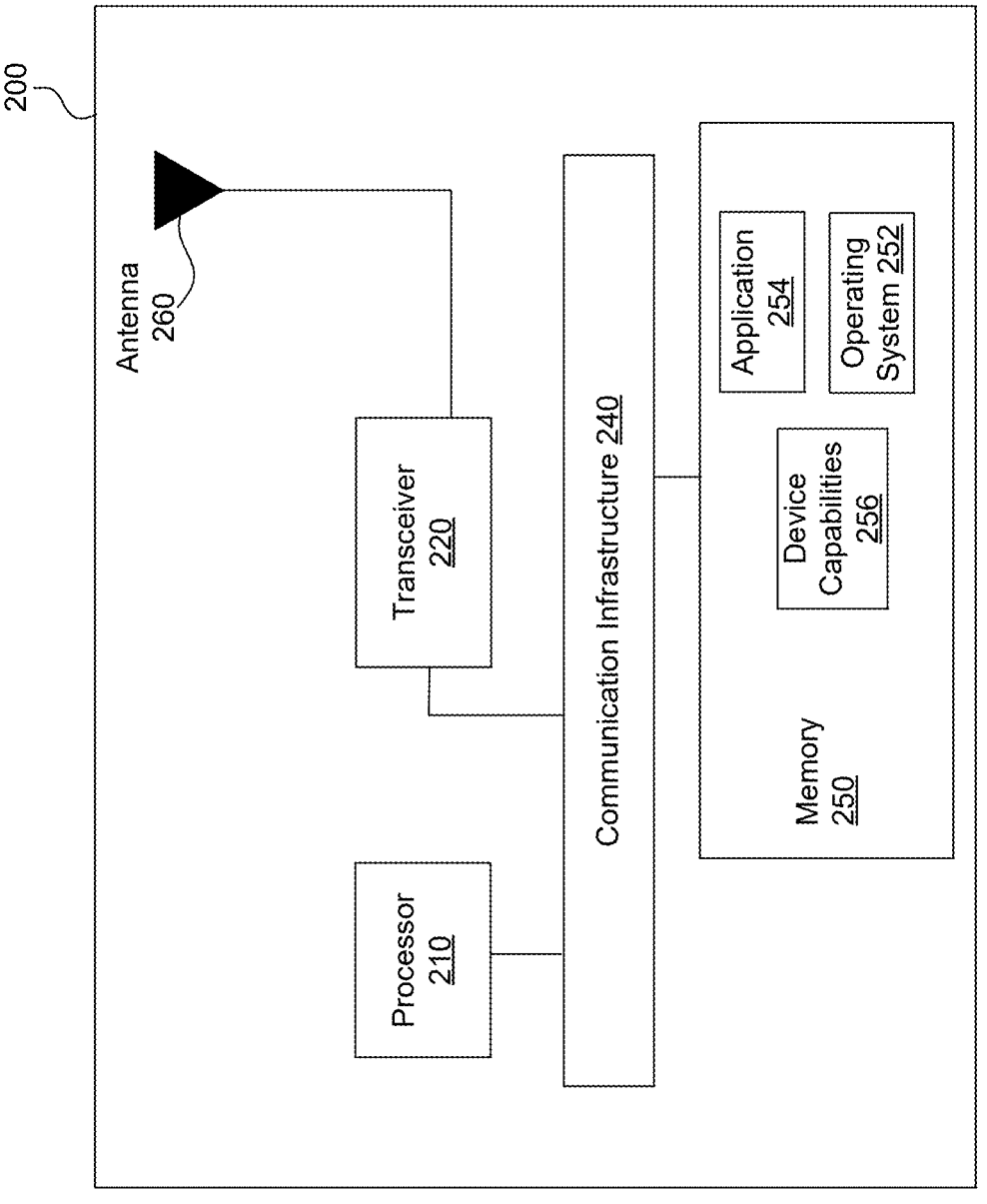
FIG. 2 illustrates a block diagram of an example database system, according to some embodiments of the disclosure.

FIG. 2 illustrates a block diagram of an example database system, according to some embodiments of the disclosure. The electronic device 200 may be any of the electronic devices (e.g., the index servers 102, 104, and 106, and the UEs 108 and 110, or a combination thereof of FIG. 1) of the system 100. The electronic device 200 includes a processor 210, one or more transceivers 220, a communication infra-structure 240, a memory 250, an operating system 252, an application 254, device capabilities 256, and antenna 260. Illustrated systems are provided as exemplary parts of electronic device 200, and electronic device 200 may include other circuit(s) and subsystem(s). Also, although the systems of electronic device 200 are illustrated as separate components, the embodiments of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage trans-fer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At correspond-ing layers of the protocol stack, the operating system 252 includes control mechanisms and data structures to perform the functions associated with that layer.

According to some examples, the application 254 may be stored in the memory 250. The application 254 may include applications (e.g., user applications) used by the electronic device 200 and/or a user of the electronic device 200. In some embodiments, the device capabilities 256 may be stored in the memory 250.

The electronic device 200 may also include the commu-nication infrastructure 240. The communication infrastruc-ture 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling electronic device 200 of the system 100 to implement database query using major CTS, as described herein. Alter-natively, or additionally, the processor 210 can be "hard coded" to implement database query using major CTS, as described herein.

The one or more transceivers 220 transmit and receive communications signals support mechanisms for imple-menting database query using major CTS. Additionally, the one or more transceivers 220 transmit and receive commu-nications signals that support mechanisms for measuring communication link(s), generating and transmitting system information and data, and receiving the system information and data. According to some embodiments, the one or more transceivers 220 may be coupled to the antenna 260 to wirelessly transmit and receive the communication signals. The antenna 260 may include one or more antennas that may be the same or different types and can form one or more antenna ports. In some embodiments, the antenna 260 can be replaced or used in combination with wired communication interferences, such as Ethernet, Universal Serial Bus (USB), serial port, serial advanced technology attachment (SATA), and fiber optic interferences. The one or more transceivers 220 allow electronic device 200 to communicate with other devices that may be wired and/or wireless. In some examples, the one or more transceivers 220 may include processors, controllers, radios, sockets, plugs, buffers, and like circuits/devices used for connecting to and communi-cation on networks. According to some examples, the one or more transceivers 220 include one or more circuits to connect to and communicate on wired and/or wireless networks.

According to some embodiments of this disclosure, the one or more transceivers 220 may include a cellular sub-system, a WLAN subsystem, and/or a Bluetooth™ subsys-tem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the trans-ceivers 220 may include one or more circuits (including a Bluetooth™ transceiver) to enable connection(s) and com-munication based on, for example, Bluetooth™ protocol, the Bluetooth™ Low Energy protocol, or the Bluetooth™ Low Energy Long Range protocol. For example, the transceiver 220 may include a Bluetooth™ transceiver. Additionally, the one or more the transceivers 220 may include one or more circuits (including a cellular transceiver) for connecting to and communicating on cellular networks.

As discussed in more detail below with respect to FIGS. 3-7, processor 210 may implement different mechanisms for implementing database queries using major CTS as discussed with respect to the system 100 of FIG. 1.

Figure 3:
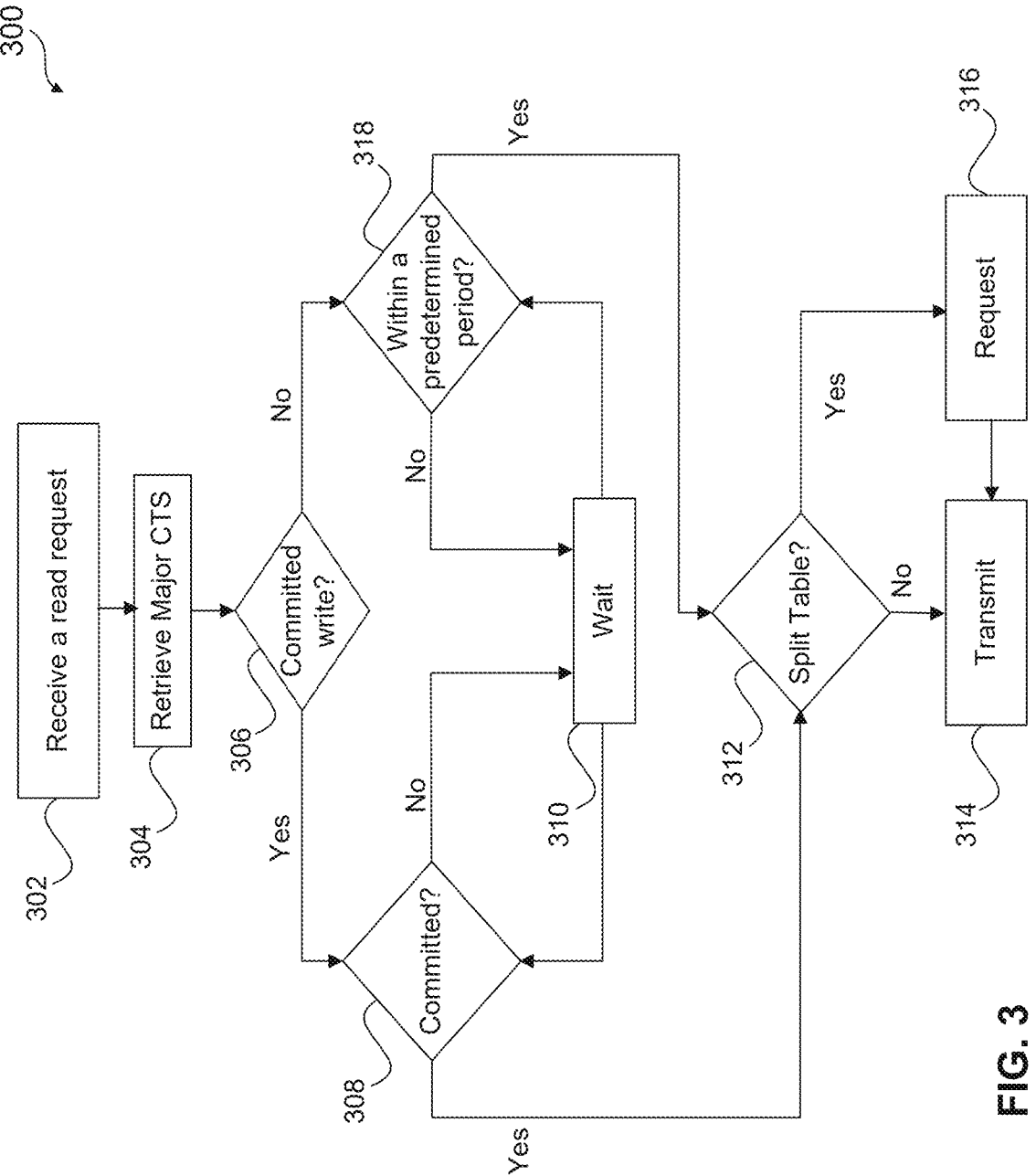
FIG. 3 illustrates an example method of reading and writing using the major CTS, according to some embodiments of the disclosure.

FIG. 3 illustrates an example method 300 of reading and writing using the major CTS, according to some embodiments of the disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Figure 7:
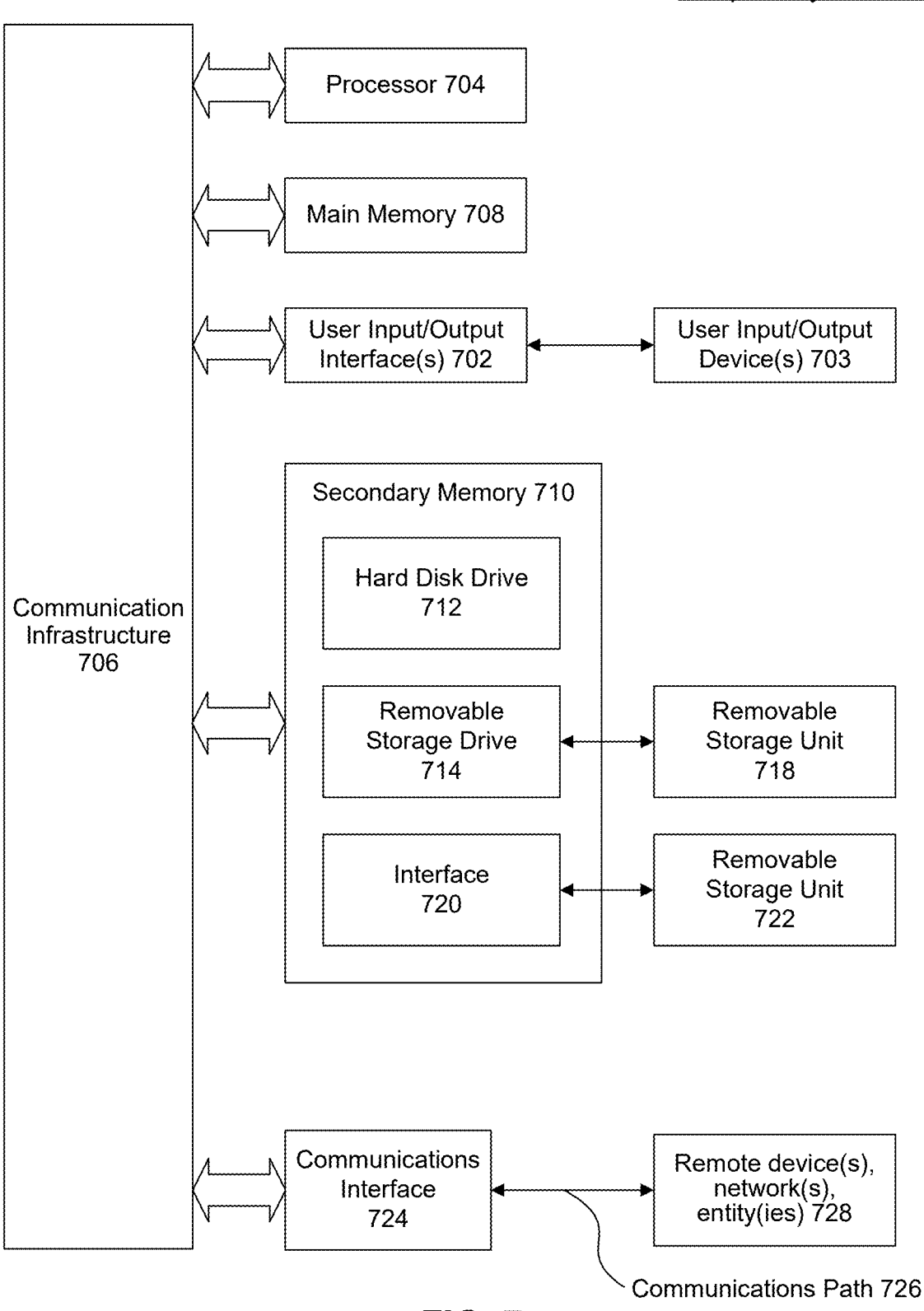
FIG. 7 illustrates an example computer system for implementing some embodiments of the disclosure or portion(s) thereof.

As a convenience and not a limitation, FIG. 3 may be described with regard to elements of FIGS. 1, 2, and 7. The example method 300 may represent the operation of devices (e.g., the index servers 102, 104, and 106, and the UEs 108 and 110, or a combination thereof of FIG. 1) implementing database query using major CTS. The example method 300 may also be performed by computer system 700 of FIG. 7. But the example method 300 is not limited to the specific embodiments depicted in those figures and other systems may be used to perform the method, as will be understood by those skilled in the art. It is to be appreciated that not all operations may be needed, and the operations may not be performed in the same order as shown in FIG. 3.

At 302, an index server, such as the index server 104, may receive a read request from a UE, such as the UE 108. The read request, such as a data query, may indicate a predetermined delay, such as two seconds. In some embodiments, the predetermined delay may correspond to a delay that the UE 108 is willing to or able to tolerate. For example, the read request may indicate that the UE 108 is willing to take data that has been updated or refreshed in the past two seconds.

At 304, the index server retrieves a major CTS from a memory of the index server. As discussed above, the major CTS may be received from another index server, such as the index server 102. In some embodiments, the major CTS indicates a time stamp of the most recent update. For example, the major CTS may indicate a time stamp 7010. In such a case, the major CTS indicates that updates corresponding to the time stamp 7010 are the most recent update. In some embodiments, the major CTS may also include a first time point. Thus, the major CTS indicates that the updates corresponding to the time stamp 7010 are the most recent at least at the first time point.

At 306, the index server determines whether the read request is directed to a committed writing operation. For example, as discussed above, the UE 106 may have transmitted a write command to the index server 102 and the UE 106 uses the read request to verify whether the write command has completed. In such a case, the control moves to 308.

At 308, the index server determines whether the post-commit of the writing operation has been received and processed locally. For example, the index server 102 may receive the write command at the time stamp 7010. If the index server 104 has received and completed an update from the index server 102 corresponding to the time stamp 7010, the index server 104 determines that the writing operation has been committed. In such a case, the control moves to 312.

At 312, the index server determines whether data requested by the read request is included in a table that is split among multiple index servers. For example, the third table is split among the index servers 102, 104, and 106. In other words, the data request is stored in a distributed database including the index servers 102, 104, and 106. In such a case, the control moves to 316.

At 316, the index server may request data from other index servers. For example, the index server 104 may request the first portion of the third table from the index server 102 and request the third portion of the third table from the index server 106. In such a case, the index server 104 may collect data requested and return the data to the UE.

Referring back to 312, the index server may determine that the data requested is not split in different tables. In some embodiments, the index server may also determine that the data requested is stored in the index server. In such a case, the index server transmits the data request back to the UE.

Referring back to 308, the index server may determine that the write operation has not been committed. For example, the index server 104 may still be waiting for the index server 102 to transmit the update. In such a case, the index server waits for the write operation to complete. Once the write operation is complete, the control may move back to 308 and then to 312.

Referring back to 306, the index server may determine that the read request is not directed to a committed writing operation. In some embodiments, the read request may indicate that the predetermined delay is acceptable. The control moves to 318.

At 318, the index server determines whether the major CTS is within the predetermined delay. In some embodiments, the index server may determine a present time to be a second time point. The index server may determine an age of the major CTS by subtracting the first time point from the second time point. The age of the major CTS is larger than the predetermined period, the index server determines that the major CTS is too old and the control moves to 310.

At 310, the index server waits until it receives an updated major CTS. For example, the index server 102 may transmit an update along with the updated major CTS to the index server 104. For another example, the index server 102 may transmit a heartbeat message to the index server 104 indicating that the current major CTS is up-to-date. In either case, the age of the major CTS is updated and within the predetermined period. The control moves back to 318.

Referring back to 318, if the index server determines that the major CTS is within the predetermined period, the control moves to 312. The index server then processes as discussed above regarding 312.

Figure 4:
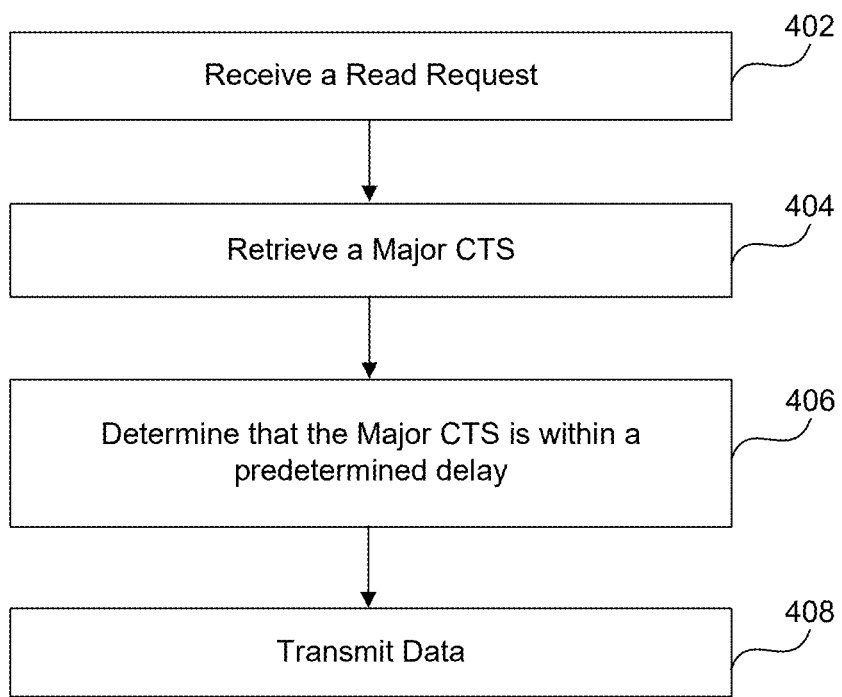
FIG. 4 illustrates an example method of implementing the major CTS, according to some embodiments of the disclosure.

FIG. 4 illustrates an example method 400 of implementing the major CTS, according to some embodiments of the disclosure. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

As a convenience and not a limitation, FIG. 4 may be described with regard to elements of FIGS. 1, 2, and 7. The example method 400 may represent the operation of devices (e.g., the index servers 102, 104, and 106 and the UEs 108 and 110 of FIG. 1) implementing the database query using major CTS. The example method 400 may also be performed by computer system 700 of FIG. 7. But the example method 400 is not limited to the specific embodiments depicted in those figures and other systems may be used to perform the method, as will be understood by those skilled in the art. It is to be appreciated that not all operations may be needed, and the operations may not be performed in the same order as shown in FIG. 7.

At 402, an index server, such as the index server 104, may receive a read request from a UE, such as the UE 108. In some embodiments, the read request is a data query and indicates a predetermined delay.

At 404, the index server retrieves a major CTS. In some embodiments, the index server may include a memory and the index server retrieves the major CTS from the memory. In addition, the major CTS may indicate an age of data in the memory as discussed below.

At 406, the index server determines that the major CTS is within the predetermined delay. In some embodiments, index server may determine an age of the major CTS based on a first time point when the major CTS was informed to the index server and a second time point when the read request was received. For example, another index server, such as the index server 102, may inform the index server the major CTS at the first time point via a heartbeat message and/or an update.

At 408, the index server transmits data corresponding to the major CTS to the UE in response to determining that the major CTS is within the predetermined delay. For example, the index server may determine that the data stored in the index server is up-to-date because the data include an update corresponding to the major CTS.

Figure 5:
FIG. 5 illustrates an example of database replication using the major CTS, according to some embodiments of the disclosure.

FIG. 5 illustrates an example 500 of database replication using the major CTS, according to some embodiments of the disclosure. Example 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

As a convenience and not a limitation, FIG. 5 may be described with regard to elements of FIGS. 1, 2, and 7. The example 500 may represent the operation of devices (e.g., the index servers 102, 104, and 106, and the UEs 108 and 110, or a combination thereof of FIG. 1) implementing database replication using the major CTS. The example 500 may also be performed by computer system 700 of FIG. 7. But the example method 500 is not limited to the specific embodiments depicted in those figures and other systems may be used to perform the method, as will be understood by those skilled in the art. It is to be appreciated that not all operations may be needed, and the operations may not be performed in the same order as shown in FIG. 5.

In some embodiments, the example 500 includes an index server 502, an index server 504, and a client device 506. The index server 502 may be a master index server and the index server 504 may be a replica server. Thus, index server 504 may store replica data of the index server 502. For example, the index server 502 may transmit replica of data stored in the index server 502 to the index server 504. The index server 502 may further transmit updates of the data to the index server 504. In some embodiments, the index server 502 may include a plurality of updates with corresponding time stamps, such as 7000, 7001, 7002, 7010, 7014, and 7015. The higher the number, the later in time. Thus, the update of the time stamp 7015 is the latest update here. In some embodiments, the index server 502 may transmit the updates to the index server 504. For example, the index server 502 may transmit the update of the time stamp 7000 to the index server 504.

In some embodiments, the index server 502 may bundle updates when writing to the index server 504 as discussed above. For example, the index server 502 may have updated at time stamps 7000, 7001, 7002, and 7010. The index server 502 may configure the index server 504 to update after the time stamps 7000 and 7010. Thus, instead of configuring the index server 504 to update four times, i.e., at the time stamps 7000, 7001, 7002, and 7010, the index server 502 may configure the index server 504 to update two times, i.e., at the time stamps 7000 and 7010 and skipping the time stamps 7001 and 7002. Thus, after the time stamp 7010, the index server 502 may configure the index server 504 to update regarding changes made in the time stamps 7001, 7002, and 7010. This is beneficial because both the index servers 102 and 104 save cost of updating at the time stamps 7001 and 7002.

In some embodiments, the index server 504 may receive a data query from the client device 506. The data query may indicate a predetermined delay, such as two seconds, instead of a particular time stamp. In such a case, the index server 504 may return the data to the client device 506 if the data is within the predetermined delay. Otherwise, the index server 504 may wait for an update from the index server 502 to satisfy the predetermined delay. For example, the index server 504 may determine that the latest update in the index server 504 corresponds the time stamp 7010. The index server 504 may further determine that the time stamp 7010 has an age of 0.7 seconds. In such a case, the data in the index server 504 is within the predetermined delay because 0.7 seconds is smaller than two seconds. Thus, the index server 504 may transmit the data to the client device 506. In some embodiments, the age of the time stamp 7010 may be more than two seconds, such as 2.2 seconds. In such a case, the index server 504 may determine that the data in the index server 504 is out of date. Thus, the index server 504 may refrain from transmitting to the client device 506 until the data in the index server 504 becomes up-to-date. For example, the index server 504 may receive a new update from the index server 502 and an age of the new update is less than two seconds. For another example, the index server 502 may inform the index server 504 that the 7010 update is still up-to-date via a heartbeat message as discussed below.

Figure 6:
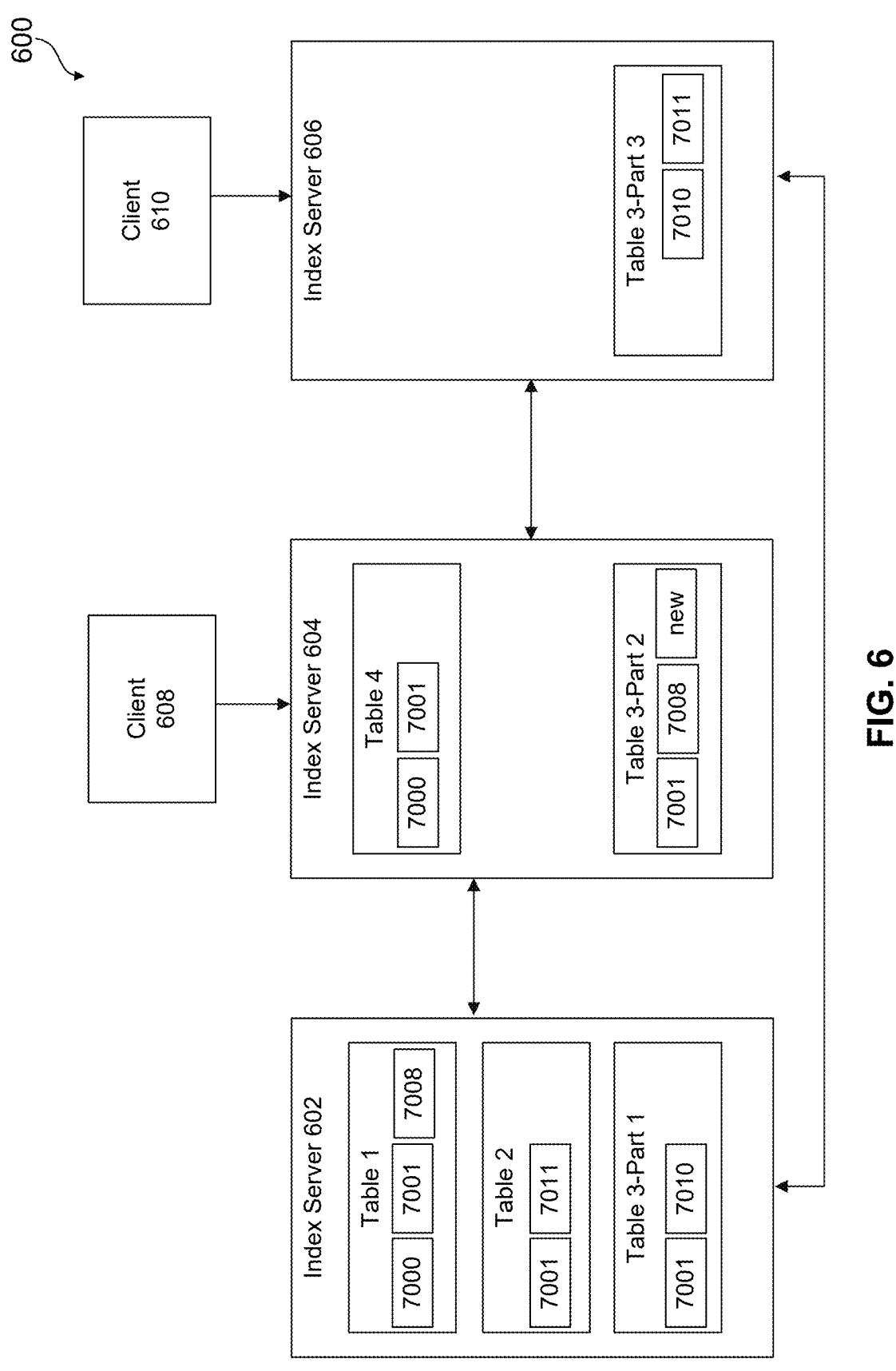
FIG. 6 illustrates an example method of a distributed database using the major CTS, according to some embodiments of the disclosure.

FIG. 6 illustrates an example 600 of a distributed database using the major CTS, according to some embodiments of the disclosure. Example 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

As a convenience and not a limitation, FIG. 6 may be described with regard to elements of FIGS. 1, 2, and 7. The example 600 may represent the operation of devices (e.g., the index servers 102, 104, and 106, and the UEs 108 and 110, or a combination thereof of FIG. 1) implementing the distributed database using the major CTS. The example 600 may also be performed by computer system 700 of FIG. 7. But the example method 600 is not limited to the specific embodiments depicted in those figures and other systems may be used to perform the method, as will be understood by those skilled in the art. It is to be appreciated that not all operations may be needed, and the operations may not be performed in the same order as shown in FIG. 6.

In some embodiments, the example 600 includes an index server 602, and index server 604, an index server 606, a client device 608, and a client device 610. The index server 602 may include a table 1 and a table 2 that include multiple updates. For example, the table 1 may include updates of time stamps 7000, 7001, and 7008. For another example, table 2 may include updates of time stamps 7001 and 7011. Similarly, the index server 604 may include a table 4 that includes updates of time stamps 7000 and 7001. In some embodiments, the index servers 602, 604, and 606 may form a distributed database that stores data in the multiple index servers. For example, the index server 602 may include a table 3 part 1, the index server 602 may include a table 3 part 2, and the index server 602 may include a table 3 part 3. Each part of the table 3 includes their respective data. For example, data of the table 3 are split along the index servers 602, 604, and 606. In some embodiments, data stored in each index server may have their respective updates. For example, the table 3 part 1 may include updates of time stamps 7001 and 7010.

In some embodiments, the client device 608 may update data stored in the table 3. For example, the client device 608 may transmit a write command to the index server 604. The write command may include first data to be stored in the table 3 part 1 in the index server 602, second data to be stored in the table 3 part 2 in the index server 604, and third data to be stored in the table 3 part 3 in the index server 606. In some embodiments, the index server 602 may be a master index server. In such a case, the index server 604 forwards the write command to the index server 602. Because the index server 602 is the master server, it commits writing the first data to the table 3 part 1 by itself. The index server 602 then transmits a pre-commit command regarding the second data to the index server 604 and a pre-commit command regarding the third data to the index server 606. After the index servers 604 and 606 confirm, the index server 602 then transmits post-commit commands to the index servers 604 and 606 to complete writing the second data and the third data.

In some embodiments, the index server 606 may complete writing the third data prior to the index server 604 completes writing the second data. For example, index server 604 may take a longer time to prepare resources to complete writing the second data. In such a case, there may be a gap period when the index server 606 completes writing the third data, but the index server 604 may still be pending the post-commit command. In some embodiments, the client device 610 may transmit a read query to the index server 606 during the gap period. Because the first data, the second data, and the third data are all included in the write command received by the index server 604, they all correspond to a time stamp. Thus, when the index server 606 receives the read query from the client device 610, the index server 106 may determine that the most up-to-date update is the third data in the table 3 part 3 corresponding to the time stamp 7011. In such a case, the index server 606 may send a query to the index server 604 requesting the update corresponding to the time stamp 7011. However, as discussed above, the index server 604 may have not completed writing the second data, which correspond to the time stamp 7011, into the table 3 part 2 in the index server 604. Thus, the index server 604 may need to wait until the writing of the second data is complete. This can cause delays in returning data back to the client 610.

In some embodiments, the index server 606 may be informed of a major CTS, as similarly discussed above. For example, the index server 602 may transmit a heartbeat message to the index server 606 indicating that the update of the time stamp 7010 is up-to-date. When the index server 606 receives the read query from the client device 610, as discussed above, the index server 606 may determine that the heartbeat message was received 0.8 seconds ago and thus the update of the time stamp 7010 has an age of 0.8 seconds. Furthermore, the read query may indicate a predetermined delay, such as 2 seconds. In such a case, the index server 606 may transmit a read query to the index server 604 requesting data corresponding to the time stamp 7010, instead of the time stamp 7011 even though the index server 606 includes the update of the time stamp 7011. Once the index server 606 receives updates of the time stamp 7010 from the index server 604 and possibly from the index server 602, the index server 606 combines all the updates of the time stamp 7010 and transmits them to the client device 610. In this way, the index server 604 does not wait for the update of the time stamp 7011 and thus no delay in waiting is required. On the other hand, if the index server 606 receives the read query more than two seconds after receiving the heartbeat message, the index server 606 may determine that the update of the time stamp 7010 is out-of-date and wait until further updates or heartbeat message to transmit to the client device 610.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/or any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

Some non-limiting Examples of various embodiments are provided below.

Example 1 may include an index server comprising a memory and at least one processor coupled to the memory. The at least one processor is configured to receive a data query indicating a predetermined delay from a user equipment (UE) and retrieve a major commit time stamp (CTS) from the memory. The data query corresponds to data in the memory. The major CTS indicates an age of the data in the memory. The at least one processor is further configured to determine that the major CTS is within the predetermined delay and in response to determining that the major CTS is within the predetermined delay, transmit the data corresponding to the major CTS to the UE.

Example 2 may include a method of computer-implemented method for an index server. The method comprises receiving a data query indicating a predetermined delay from a user equipment (UE) and retrieving a major commit time stamp (CTS) from the memory. The data query corresponds to data in the memory. The major CTS indicates an age of the data in the memory. The method further comprises determining that the major CTS is within the predetermined delay and in response to determining that the major CTS is within the predetermined delay, transmitting the data corresponding to the major CTS to the UE.

Example 3 may include a non-transitory computer-readable medium (CRM) comprising instructions to, upon execution of the instructions by one or more processors of an index server, cause the index server to perform operations. The operations comprise receiving a data query indicating a predetermined delay from a user equipment (UE) and retrieving a major commit time stamp (CTS) from the memory. The data query corresponds to data in the memory. The major CTS indicates an age of the data in the memory. The operations further comprise determining that the major CTS is within the predetermined delay and in response to determining that the major CTS is within the predetermined delay, transmitting the data corresponding to the major CTS to the UE.

What is claimed is:

1. An index server, comprising:
a memory; and
at least one processor coupled to the memory and configured to:
receive a data query corresponding to data in the memory from a user equipment (UE), wherein the data query indicates a predetermined delay;
retrieve a major commit time stamp (CTS) from the memory, wherein the major CTS indicates an age of the data in the memory;
determine that the major CTS is within the predetermined delay; and
in response to determining that the major CTS is within the predetermined delay, transmit the data corresponding to the major CTS to the UE.

2. The index server of claim 1, wherein the at least one processor is further configured to:
receive a second data query indicating the predetermined delay from the UE, wherein the second data query corresponds to second data;
determine that the major CTS is outside the predetermined delay; and
refrain from transmitting the second data to the UE.

3. The index server of claim 2, wherein the at least one processor is further configured to:
receive an update from a second index server, wherein the update indicates an updated major CTS;
determine that the updated major CTS is within the predetermined delay; and
transmit the second data corresponding to the major CTS to the UE.

4. The index server of claim 3, wherein the update includes a plurality of data changes.

5. The index server of claim 1, wherein the at least one processor is further configured to:
receive a second data query corresponding to second data and indicating a time stamp from the UE;
determine that the second data query corresponds to a committed write request;
determine that the major CTS is older than the time stamp; and
refrain from transmitting the second data to the UE.

6. The index server of claim 5, wherein the at least one processor is further configured to:
receive an update from a second index server, wherein the update indicates the time stamp; and
transmit the second data corresponding to the time stamp to the UE.

7. The index server of claim 1, wherein the at least one processor is further configured to:
receive a second data query indicating the predetermined delay from the UE;
determine that the memory includes a data change corresponding to a time stamp, wherein the time stamp is newer than the major CTS;
determine that the major CTS is within the predetermined delay; and
request an update corresponding to the major CTS from a second index server.

8. A computer-implemented method for an index server, comprising:
receiving a data query corresponding to data in a memory of the index server from a user equipment (UE), wherein the data query indicates a predetermined delay;
retrieving a major commit time stamp (CTS) from the memory of the index server, wherein the major CTS indicates an age of data in the memory;
determining that the major CTS is within the predetermined delay; and
in response to determining that the major CTS is within the predetermined delay, transmitting the data corresponding to the major CTS to the UE.

9. The computer-implemented method of claim 8, further comprising:
receiving a second data query indicating the predetermined delay from the UE, wherein the second data query corresponds to second data;
determining that the major CTS is outside the predetermined delay; and
refraining from transmitting the second data to the UE.

10. The computer-implemented method of claim 9, further comprising:
receiving an update from a second index server, wherein the update indicates an updated major CTS;
determining that the updated major CTS is within the predetermined delay; and
transmitting the second data corresponding to the major CTS to the UE.

11. The computer-implemented method of claim 10, wherein the update includes a plurality of data changes.

12. The computer-implemented method of claim 8, further comprising:

receiving a second data query corresponding to second data and indicating a time stamp from the UE;

determining that the second data query corresponds to a committed write request;

determining that the major CTS is older than the time stamp; and refraining from transmitting the second data to the UE.

13. The computer-implemented method of claim 12, further comprising:

receiving an update from a second index server, wherein the update indicates the time stamp; and transmitting the second data corresponding to the time stamp to the UE.

14. The computer-implemented method of claim 8, further comprising:

receiving a second data query indicating the predetermined delay from the UE;

determining that the memory includes a data change corresponding to a time stamp, wherein the time stamp is newer than the major CTS;

determining that the major CTS is within the predetermined delay; and requesting an update corresponding to the major CTS from a second index server.

15. A non-transitory computer-readable medium (CRM) comprising instructions to, upon execution of the instructions by one or more processors of an index server, cause the index server to perform operations, the operations comprising:

receiving a data query indicating a predetermined delay from a user equipment (UE), wherein the data query corresponds to data in a memory of the index server;

retrieving a major commit time stamp (CTS) from the memory of the index server, wherein the major CTS indicates an age of the data in the memory;

determining that the major CTS is within the predetermined delay; and in response to determining that the major CTS is within the predetermined delay, transmitting the data corresponding to the major CTS to the UE.

16. The non-transitory CRM of claim 15, wherein the operations further comprise:

receiving a second data query indicating the predetermined delay from the UE, wherein the second data query corresponds to second data;

determining that the major CTS is outside the predetermined delay; and refraining from transmitting the second data to the UE.

17. The non-transitory CRM of claim 16, wherein the operations further comprise:

receiving an update from a second index server, wherein the update indicates an updated major CTS;

determining that the updated major CTS is within the predetermined delay; and transmitting the second data corresponding to the major CTS to the UE.

18. The non-transitory CRM of claim 15, wherein the operations further comprise:

receiving a second data query corresponding to second data and indicating a time stamp from the UE;

determining that the second data query corresponds to a committed write request;

determining that the major CTS is older than the time stamp; and refraining from transmitting the second data to the UE.

19. The non-transitory CRM of claim 18, wherein the operations further comprise:

receiving an update from a second index server, wherein the update indicates the time stamp; and transmitting the second data corresponding to the time stamp to the UE.

20. The non-transitory CRM of claim 15, wherein the operations further comprise:

receiving a second data query indicating the predetermined delay from the UE;

determining that the memory includes a data change corresponding to a time stamp, wherein the time stamp is newer than the major CTS;

determining that the major CTS is within the predetermined delay; and requesting an update corresponding to the major CTS from a second index server.

* * * * *